United States Patent [19]
Fritts et al.

[11] Patent Number: 5,840,439
[45] Date of Patent: *Nov. 24, 1998

[54] BATTERY COVER

[75] Inventors: Robert W. Fritts, Thomasville; David M. Revak, High Point, both of N.C.

[73] Assignee: Douglas Battery Manufacturing Company, Winston-Salem, N.C.

[ * ] Notice: The term of this patent shall not extend beyond the expiration date of Pat. No. 5,731,100.

[21] Appl. No.: 961,994

[22] Filed: Oct. 11, 1997

Related U.S. Application Data

[63] Continuation of Ser. No. 796,425, Feb. 6, 1997, Pat. No. 5,731,100.
[51] Int. Cl.$^6$ ..................................................... H01M 2/12
[52] U.S. Cl. ............................... 429/84; 429/87; 429/175; 429/176
[58] Field of Search ................................ 429/71, 72, 82, 429/84, 87, 88, 175, 176

[56] References Cited

U.S. PATENT DOCUMENTS

| | | | |
|---|---|---|---|
| 1,605,820 | 11/1926 | Edwards . | |
| 2,505,207 | 4/1950 | Riggs | 136/170 |
| 3,597,280 | 8/1971 | Hennen | 136/177 |
| 3,879,227 | 4/1975 | Hennen | 136/177 |
| 4,207,387 | 6/1980 | Jutte | 429/88 |
| 4,275,128 | 6/1981 | Sano | 429/88 |
| 4,306,002 | 12/1981 | Heiser et al. | 429/84 |
| 4,348,466 | 9/1982 | Elehew et al. | 429/84 |
| 4,371,591 | 2/1983 | Oxenreider et al. | 429/88 |
| 4,374,187 | 2/1983 | Sano | 429/175 |
| 4,486,515 | 12/1984 | Chern | 429/72 |
| 4,486,516 | 12/1984 | Poe | 249/82 |
| 4,600,664 | 7/1986 | Cramer et al. | 429/7 |
| 4,613,550 | 9/1986 | Jergl et al. | 429/53 |
| 4,851,305 | 7/1989 | Kump et al. | 429/84 |
| 5,278,003 | 1/1994 | Francisco | 429/175 |
| 5,281,492 | 1/1994 | Lin | 429/84 |
| 5,380,604 | 1/1995 | Hampe et al. | 429/84 |
| 5,424,146 | 6/1995 | Lin | 429/84 |
| 5,498,488 | 3/1996 | Stocchiero | 429/72 |
| 5,565,282 | 10/1996 | Feres et al. | 429/84 |

FOREIGN PATENT DOCUMENTS

| | | |
|---|---|---|
| 570703 A1 | 11/1993 | European Pat. Off. . |
| 4216563 A1 | 11/1993 | Germany . |

*Primary Examiner*—Anthony Skapars
*Attorney, Agent, or Firm*—Rhodes, Coats & Bennett, L.L.P.

[57] ABSTRACT

The present invention is directed to a leak resistant battery cover for storage batteries. The battery cover sealably engages a conventional battery housing having multiple cells separated by internal housing walls. The cover has a substantially flat interior area, a portion of which extends over part of each battery cell when the cover is placed upon a battery housing. The cover includes a cell chamber for each battery cell. Drain-back/vents communicate each cell chamber with its corresponding battery cell. The drain-back/vent, whether separate or integrated allows escape of electrolyte gases from the battery cells into the corresponding battery chamber and provide for the return of liquid electrolyte back to the cells from the cell chambers. None of the cell chambers communicate directly through the battery cover to atmosphere.

One or more additional chambers are provided in the cover above the central cells of the battery housing. These additional chambers are in a geometrically central area of the battery cover away from the outside perimeter of the cover. Unlike the cell chambers, the additional chambers directly communicate with atmosphere through a convoluted passage and atmospheric vent. Additionally, each additional chamber includes a drain-back/vent directly communicating with one of the central most cells in the battery housing. Thus, the central most cells communicate with the most central cell chambers and the additional chamber. The remaining battery cells do not communicate with the additional chambers.

25 Claims, 4 Drawing Sheets

BATTERY COVER

This application is a continuation of application Ser. No. 08/796,425, filed Feb. 6, 1997, now U.S. Pat. No. 5,731,100 Jul. 23, 1998.

BACKGROUND OF THE INVENTION (1) Field of the Invention

This invention relates to a storage battery cover, and more particularly to a storage battery cover offering added protection against leakage when a battery using the cover of the invention is tipped to any one of its sides.

(2) Description of the Prior Art

Conventional storage batteries include a battery housing having a housing and a closure for closing an open top end of the casing. The battery housing is generally a rectangular casing having multiple compartments or cells for receiving cell plates and electrolyte therein. The cover is heat sealed to an open top end of the battery housing casing.

The cover typically includes a main cover part (intermediate cover) and a sub-cover part (outer cover). The main cover part has a horizontally disposed plate body with a top face formed by a rectangular confining wall. The confining wall is divided by multiple partitions and walls forming associated chambers. The main cover further includes multiple service ports for pouring electrolyte into respective cell compartments within the casing and multiple degassing vents and drain-back return holes associated with each cell.

The sub-cover part is heat sealed to the main cover part along its parameter and at top edges of the partitions and chamber walls. The chambers and partitions ultimately form enclosed chambers and associated paths from the cell vent and return hole of each cell to one or more atmospheric vents.

In operation, heat that is generated during electrolysis causes the electrolyte and water in the electrolyte to evaporate. This evaporation is referred to as "gassing". Gassing of the cell occurs at any point the battery reaches the hydrogen over-voltage, producing bubbles that break at the surface introducing a mist into the venting gas stream. In conventional batteries, the vaporized electrolyte is released to atmosphere through an atmospheric vent in the closure device. Loss of electrolyte through the atmospheric vent requires replenishing electrolyte in the battery housing periodically. In order to overcome electrolyte loss, a battery housing with an enclosure capable of recovering the vaporized electrolyte was developed, thereby obviating the need for replenishing the electrolyte in the battery housing.

When the electrolyte in the cell compartments undergoes electrolysis and evaporates due to the heat generated, the vaporized electrolyte flows into the path formed in the closure through the cell vents or drain-back holes. Since the interior of the cover is in direct communication with atmosphere through the atmospheric vents, the interior temperature of the cover is less than that of the vaporized electrolyte entering the cover. The vaporized electrolyte entering the cooler atmospheric conditions, condenses into a liquid. The electrolyte condensate flows back into various cell compartments through the drain-back holes. To facilitate return of the electrolyte condensate to the individual cells, the various paths leading from the cell vents are sloped downwardly towards the drain-back holes. Returning the electrolyte condensate back to the battery cells, eliminates the need to periodically replenish electrolyte in the battery.

Unfortunately, many batteries will leak, and in many cases pour, electrolyte from the atmospheric vents when the battery is tipped to one side. Batteries are often tipped and agitated during shipping, handling and accidents, such as car wrecks. Leaking electrolyte poses a significant risk to both person and property. The electrolyte is both extremely corrosive and poisonous, not to mention the harmful effects of skin or eye contact.

Various approaches were taken in the past to deal with electrolyte spillage and leakage from a battery tipped onto one of its sides. However, none appear to provide a cost effective solution for complete steady-state leak protection when the battery is tipped onto one side and substantial leak-resistance when subjected to vibration or agitation. Certain attempts are disclosed in the following references:

U.S. Pat. No. 5,424,146 to Lin;
U.S. Pat. No. 5,380,604 to Hampe et al.;
U.S. Pat. No. 4,486,516 to Poe;
U.S. Pat. No. 4,348,466 to Elehew et al.;
U.S. Pat. No. 3,597,280 to Hennen;
U.S. Pat. No. 1,605,820 to Edwards;
European Application No. 570,703 Al to Bohle et al; and
German Patent No. 4,216,563;

As shown in these references and as practical by other manufacturers in the industry, current battery and battery cover manufacturers all place the atmospheric vent(s) near the perimeter of the battery cover. The electrolyte path leading from the individual cells to an atmospheric vent is generally relatively short and direct. When the battery is tipped onto one of its sides, the atmospheric vent is often below the level of the electrolyte in an adjacent cell and the path to atmosphere from each cell is relatively close and unencumbered. Furthermore, the drain-back holes and cell vents, which communicate directly to the chambers formed in the cover above the cells and paths leading from these chambers to the atmospheric vent, are likewise submerged below the electrolyte level within the cells of the tipped battery.

Most leak resistant covers attempt to form air-locks within various of the above-described chambers and/or paths to impede or even prevent the flow of electrolyte toward the atmospheric vent. However, due to the close proximity of the source of the electrolyte, the drain-back holes and cell vents, electrolyte is dangerously close to a direct route to an atmospheric vent. The least amount of agitation or vibration may send electrolyte flowing through the atmospheric vent and out of the battery. Many battery covers allow electrolyte to literally pour from the battery because the entire path from one or more cells to atmosphere is below electrolyte levels in the associated cells when the battery is tipped.

SUMMARY OF THE INVENTION

Accordingly, there is a need to provide a battery cover significantly reducing the risk of electrolyte spillage. Applicants have discovered a novel concept to greatly reduce the risk of electrolyte spillage by providing a multi-level venting system incorporating one or more additional chambers located in the central portion of the cover through which all venting from all cells must pass. This is accomplished by isolating the regular chambers associated with respective battery cells from a direct passage leading to the atmospheric vents and locating isolated additional chambers in a central area of the battery cover. The centrally located additional chambers communicate with the more central cells of the battery housing through their own drain-back holes and cell vents in addition to communicating with a convoluted path leading to one or more atmospheric vents. The additional chambers are defined as chambers in addition to the regular chambers associated with each cell, but also communicate with one or more of the cells. The additional chambers, and particularly, their drain-back holes and cell vents, are located near the geometric center of the battery cover. The two central cells in the battery housing each communicate with one of the regular chambers and one additional chamber. The other regular chambers may communicate with each other and preferably, communicate with the central chamber, which communicates with the central cell associated with one additional chamber.

This unique arrangement provides multiple advantages over the prior art. First, the only direct paths to atmosphere in the cover of the present invention initiate from a central portion of the battery cover and from only one or two of the more central cells. Secondly, when the battery is tipped on one of its sides, most of the electrolyte is either below the drain-back/vents in the additional chamber or must pass through one or more chambers, into one of the central cells and out through an additional chamber to escape the battery. This convoluted, multi-level path will quickly create an air-lock to prevent what little electrolyte may seep into the cover chambers and paths. Preferably, the additional chambers are configured so that the path to atmosphere starts at a point on the additional chamber near or above the electrolyte level in the more central cells when the battery is tipped.

The other regular chambers communicate through an inter-chamber path or opening with each other and to the more central regular chambers. Thus, the path to atmosphere from the outer most cell includes the outer most regular chamber, any chambers between the outer chamber and the more central regular chamber, into one of the more central cells, into one of the additional chambers, and along the path to atmosphere through one or more of the atmospheric vents. In effect, the regular chambers help form a convoluted, multi-level path to atmosphere. A multi-level path is one which travels from one cover chamber, into one of the housing cells, and into the additional chamber of the cover.

The present invention is directed to a leak resistant battery cover for storage batteries. The battery cover sealably engages a conventional battery housing having multiple cells separated by internal housing walls. The cover has a substantially flat interior area, a portion of which extends over part of each battery cell when the cover is placed upon a battery housing. The cover includes a cell chamber for each battery cell. Drain-back/vents communicate each cell chamber with its corresponding battery cell. The drain-back/vent, whether separate or integrated allows escape of electrolyte gases from the battery cells into the corresponding battery chamber and provide for the return of liquid electrolyte back to the cells from the cell chambers. None of the cell chambers communicate directly through the battery cover to atmosphere.

One or more additional chambers are provided in the cover above the central cells of the battery housing. These additional chambers are in a geometrically central area of the battery cover away from the outside perimeter of the cover. Unlike the cell chambers, the additional chambers directly communicate with atmosphere through a convoluted passage and atmospheric vent. Additionally, each additional chamber includes a drain-back/vent directly communicating with one of the central most cells in the battery housing. Thus, the central most cells communicate with the most central cell chambers and the additional chamber. The remaining battery cells do not communicate directly with the additional chambers.

In order to provide a path to atmosphere for gases escaping non-central cells, inter-chamber openings or passages connect all of the cell chambers to cell chambers directly communicating with the central cells. Preferably, the cell chambers on one half of the battery cover communicate with one another through the inter-chamber openings. Gases travel upwardly from the outer most cell into the outer cell chamber, through a first inter-chamber opening, into a central cell chamber, downwardly into a central cell, upwardly into an additional chamber, along the convoluted path and out of an atmospheric vent. None of the cell chambers include a direct path to atmosphere through the battery cover. A multi-level path traveling through one of the central cells in the battery housing is provided from any of the cell chambers to atmosphere.

Accordingly, one aspect of the current invention is to provide a leak resistant battery cover having a housing with plurality of cells having a flat rectangular cover member. The cover member includes an upper wall, a lower wall and a central area away from a perimeter. An interior area is disposed between and formed by the upper and lower walls over a portion of each of the battery cells. A first cell chamber within the interior area communicates with a centrally located cell through a chamber drain aperture and vent. A second cell chamber communicates directly with another cell through a second drain aperture and vent. An additional chamber, also located in the central area, communicates with the first central cell. The two chambers are connected by an inter-chamber path. The additional chamber communicates directly with an additional path leading to an atmospheric vent. Gases emitted from the second cell travel upwardly into the second cell chamber, through the first cell chamber, downwardly into the first centrally located cell, upwardly into the additional chamber, along the additional path and through the atmospheric vent in order to exit the battery.

The cell chamber may include various types and shapes of partitions for restricting the free flow of liquid electrolyte and electrolyte gas within and between the cell chambers. The partitions within each chamber may operate to provide various convoluted paths between the drain-back/vents and the inter-chamber openings. In the preferred embodiment, the drain-back/vents are substantially surrounded by a semi-annular partition opening into an internal chamber path exiting out into the cell chamber. Leak-resistance is generally enhanced when the exit of the internal chamber path is on a substantially opposite end of the cell chamber from the inter-chamber path entrance. For example, a linear internal chamber path extending in a direction substantially away from the entrance of the inter-chamber path creates both a convoluted path between the drain-back/vents in the inter-chamber openings and increases leak-resistance by improving the time required to develop an air lock within the battery cover to restrict or stop electrolyte flow from the battery cells.

In order to return electrolyte condensing in or spilling into the various chambers, the chambers and associated paths have floors continuously sloping downward toward associated drain apertures communicating with the battery cells. Preferably, the additional chamber openings, connecting the additional chamber to the additional path, and the additional drain apertures are positioned on substantially opposite ends of the additional chamber.

Conventional batteries typically have six cells. According to the current invention, covers for these batteries include two sets of cell chambers, each having three inter-connected cell chambers. Two additional chambers are provided wherein each chamber communicates with one of the central battery cells and at least one atmospheric vent. Thus, gases emitted from the intermediate or outer cells upwardly into the corresponding intermediate or outer cell chamber must travel through a central cell chamber, downwardly into a central cell, upwardly into a first additional chamber, through an additional path and atmospheric vent to exit to atmosphere.

A convoluted additional path to atmosphere will provide greater leak-resistance. Additional paths initiating from different additional chambers may converge into a common path and later diverge into separate paths leading to separate atmospheric vents or chambers containing these atmospheric vents. Other aspects of the invention will become apparent to those skilled in the art after reading the following description of the preferred embodiments when considered with the drawings.

DESCRIPTION OF THE PREFERRED EMBODIMENT

Figure 1:
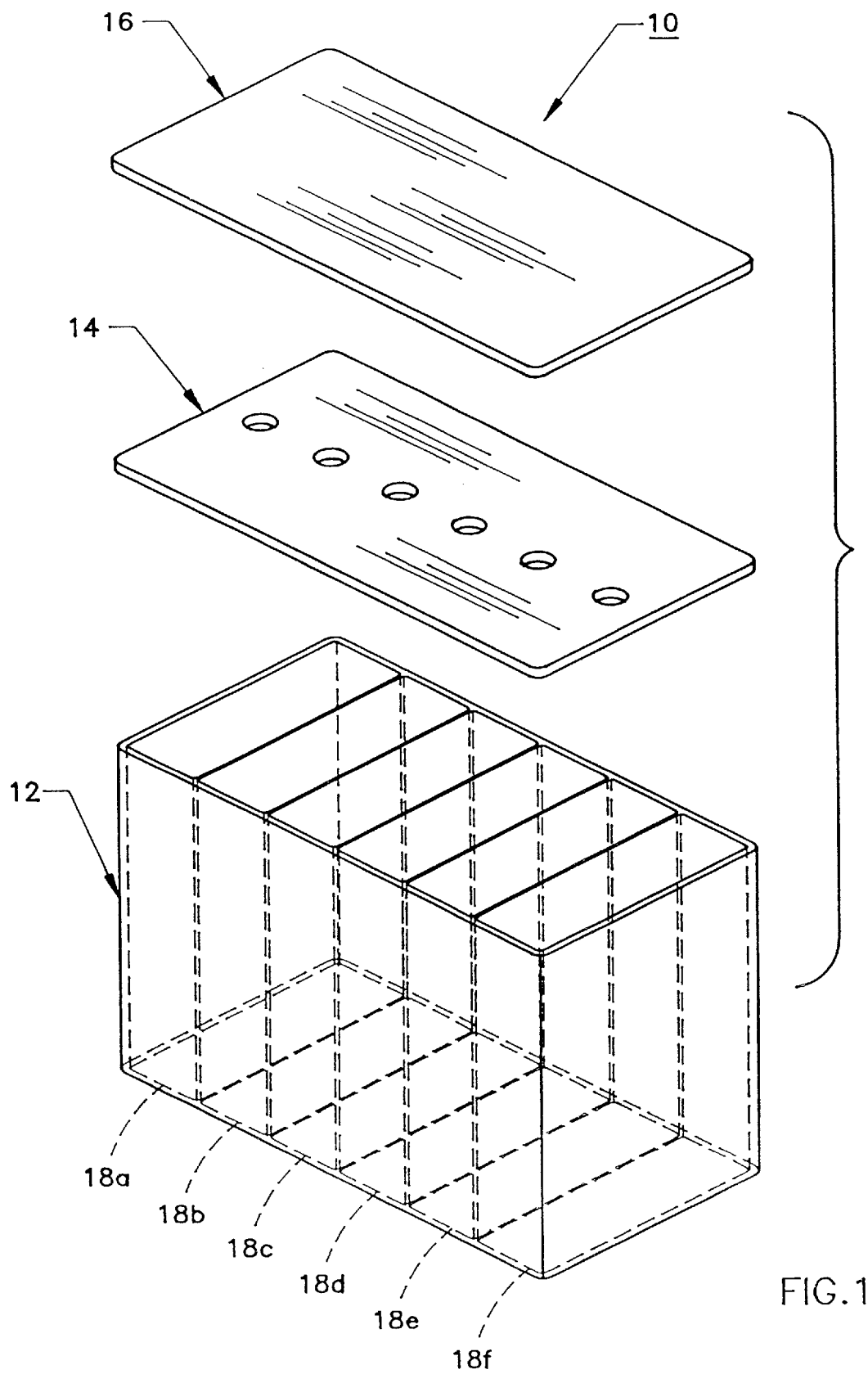
FIG. 1 is a perspective view of a battery having a leak resistant battery cover constructed according to the present invention.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Referring now to the drawings in general, and FIG. 1 in particular, understand that the illustrations are for the purpose of describing preferred embodiments of the invention and are not intended to limit the invention thereto. As best seen in FIG. 1, a battery, generally designated 10, is shown constructed according to the present invention. The battery 10 includes three major subassemblies: a battery housing 12, an intermediate cover 14 and a outer cover 16. The intermediate cover 14 is normally heat sealed or glued to housing 12 and the outer cover 16 is normally heat sealed to the intermediate cover 14. A typical automotive battery housing 12 includes a plurality of partitioned cells 18a –f which are substantially isolated from each other when the covers 14 and 16 are sealed onto the housing 12. Since the embodiments of the invention are directed toward providing a leak resistant battery cover, it is understood that various types of venting devices are applicable in the leak resistant arrangement disclosed and particular venting arrangements are not described in detail. A detailed overview of battery operation and electrolyte flow in a leak resistant configuration is set forth in applicant's co-pending application, Ser. No. 08/961, 701, filed Oct. 31, 1997, still pending entitled LEAK RESISTANT BATTERY COVER, incorporated herein by reference.

Figure 2:
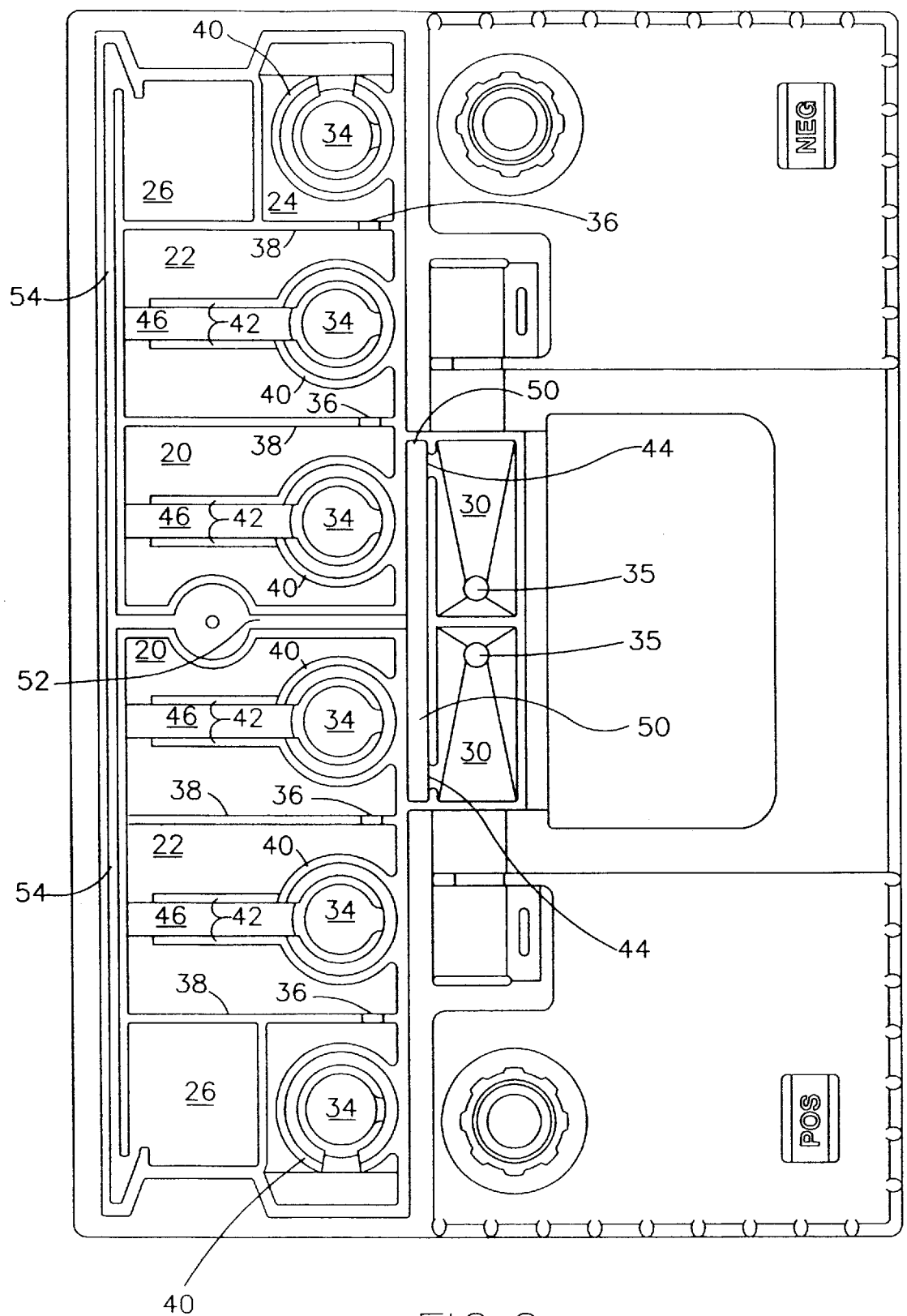
FIG. 2 is a top view of the intermediate cover of the leak resistant battery closure constructed according to the present invention.

The intermediate cover 14 and outer cover 16 are designed to form an enclosed system of chambers and passages when the covers 14 and 16 are joined. Turning now to FIG. 2, a top view of an intermediate cover 14 is shown. Viewing the intermediate cover 14 from above is analogous to viewing a cross section of any type of cover incorporating the inventive concept disclosed herein. The cover includes a plurality of various types of chambers throughout an open interior. These chambers include central chambers 20, intermediate chambers 22, outside chambers 24, atmospheric venting chambers 26 and additional chambers 30. The central chambers 20 are aligned above central battery cells 18c and 18d. Intermediate chambers 22 are aligned above cells 18b and 18e. The outside chambers and atmospheric venting chambers are aligned above cells 18a and 18f. The additional chambers 30 are centrally located and, along with the central chambers 20, are aligned above the more central cells 18c and 18d. The additional chambers 30 are located in a geometrically central area of the cover substantially away from the outer perimeter. Although chamber placement is quite variable, particularly with the venting chambers 26, the central, intermediate and outside chambers 20, 22, 24 preferably are aligned directly above the underlying battery cells 18a –f.

Figure 3:
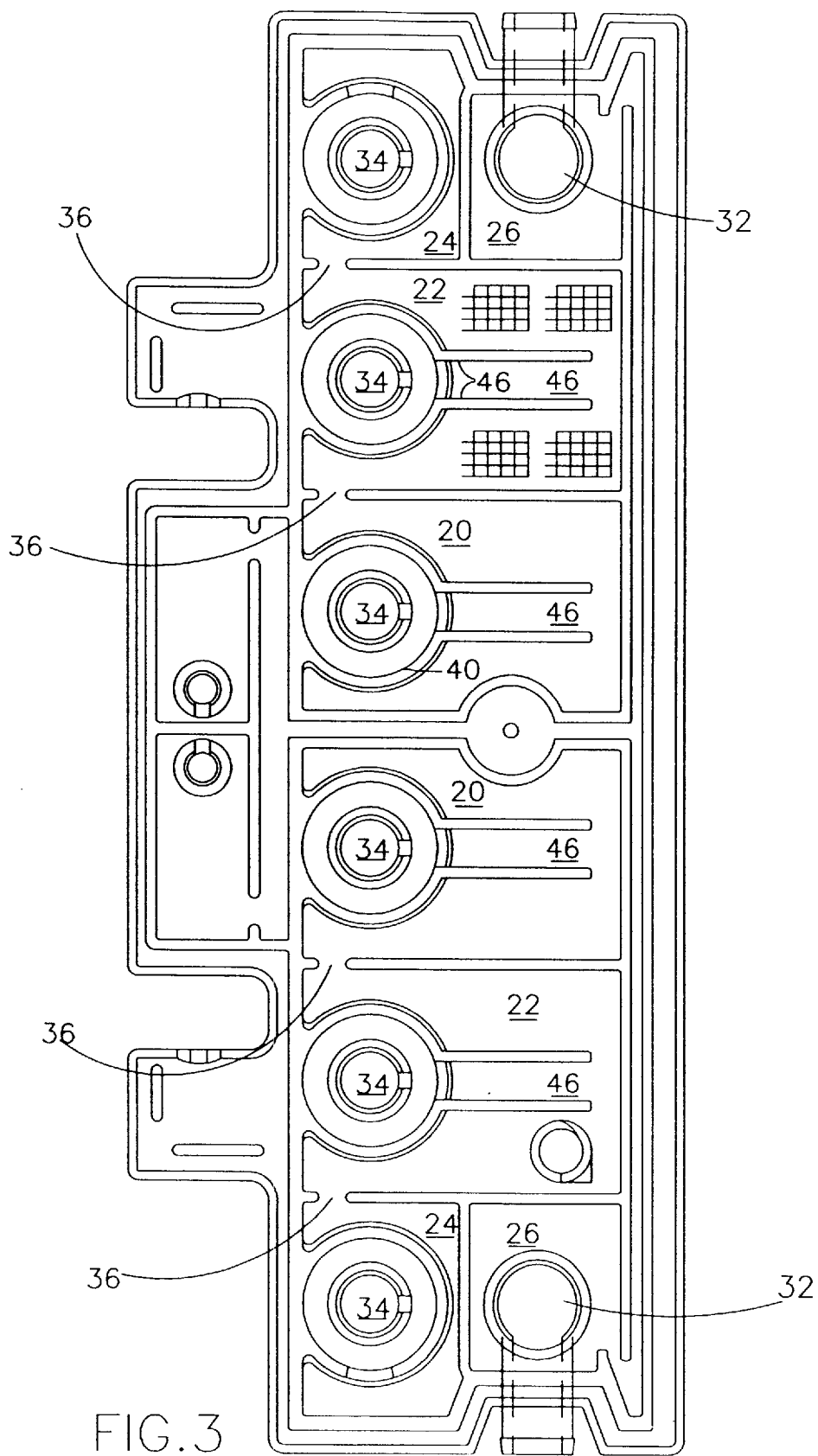
FIG. 3 is a bottom view of the outer cover of the leak resistant battery closure constructed according to the present invention.

The interior area of the battery cover is exposed to atmosphere through one or more atmospheric vents 32 (See FIG. 3). Preferably, the atmospheric vents are placed in and directly communicate with the atmospheric vent chamber 26. The atmospheric vent 32 includes a porus disk located on the outer cover through which any gas must pass through before exiting the cover.

The central, intermediate and outside chambers 20, 22, 24 each include an integrated cell drain-back/vent 34. Although separate drain-backs and vents are acceptable, most battery covers integrate the drain-back and venting function. The vent portion of the drain-back/vent 34 facilitates the transfer of electrolyte gas from the individual cells 18 into a corresponding chamber in communication with the cell 18. The drain-back feature allows a liquid electrolyte condensate to flow freely back into the cells 18 from the corresponding chamber.

Each of the central, intermediate and outside chambers 20, 22, 24 are substantially isolated from one another. The central, intermediate and outside chambers 20, 22, 24 which are generally adjacent to one another on one side of the battery cover form a first set of chambers and the central, intermediate and outside chambers 20, 22, 24 on the other half of the cover form a second set. These chambers 20, 22, 24 communicate with one another through inter-chamber paths/openings 36, but do not communicate directly with any of the chambers from the other set or the additional chambers 30. Thus, the central, intermediate and outside chambers 20, 22, 24 of one set only communicate directly with chambers within that set. The additional chambers 30 are likewise isolated within the cover from any of the central, intermediate and outside chambers 20, 22, 24 comprising the first and second chamber sets.

The inter-chamber paths or openings 36 are formed on the outer cover wherein when the battery is in its normal upright position, liquid electrolyte is substantially blocked from exiting one chamber and entering an adjacent chamber by separating partitions forming a partial wall between adjacent chambers. The separating partition on the intermediate cover 14 is uniform and extends along the length of the chamber at a uniform height. The mating separating partition 38 on the outer cover incorporates the inter-chamber path/opening 36. This arrangement substantially inhibits liquid electrolyte from flowing between chambers while allowing electrolyte gases to freely flow between chambers.

Preferably, each of the central, intermediate and outside chambers 20, 22, 24 include a semi-annular partition 40 surrounding the respective drain-back/vent 34. Linear partitions 42 extend outwardly away from an opening formed by the annular partition 40. The annular partition 40 provides an initial chamber path 42 in a direction preferably away from the inter-chamber paths/opening 36. Although annular and linear partitions are depicted, partitions of various geometric shapes and sizes are acceptable. The initial chamber paths provide a convoluted path from the drain-back/vents 34 to the inter-chamber paths/openings 36 to improve leak resistant characteristics of the battery cover. The partition arrangement may vary from chamber to chamber. Attention is drawn to the different layouts of central and intermediate chambers 20, 22 and the outside chamber 24.

As noted, the central, intermediate and outside chambers 20, 22, 24 of one set do not directly communicate with the central, intermediate or outside chambers 20, 22, 24 of the other set or with the additional chamber 30. The additional chambers 30 provide an additional drain-back/vent 35 communicating only with the central chambers 20, respectively. An additional chamber opening 44 is provided for each additional chamber 30. The additional chamber opening 44 communicates directly to an initial vent path 50 which preferably converges into a common vent path 52 and ultimately diverges into two final vent paths 54 leading to the vent chambers 26. The atmospheric vents 32 are located in these atmospheric vent chambers 26 to communicate the interior of the battery with atmosphere. Preferably, the atmospheric vents 32 and vent chambers 26 are located on opposite ends of the battery and the common vent path runs along a central transverse axis before diverging into the final vent paths 54.

Keeping the respective chambers sets and additional chambers 30 from directly communicating with one another within the cover to avoid a direct path to atmosphere from any of the central, intermediate or outside chambers 20, 22, 24 is important. In other words, the central, intermediate and outside chambers 20, 22, 24 do not have a path to atmosphere totally contained within the cover. The path to atmosphere from these chambers 20, 22, 24 includes a downward reentry into the battery housing through one of the central cells 18c or 18d, upwardly through the additional chamber 30 via the additional respective drain-back/vent 35, and through the initial, common, and final vent paths 50, 52, 54 to the atmospheric vent 32 in the vent chamber 26. Thus, electrolyte gas exiting one of the cells 18 into one of the central, intermediate or outside chambers 20, 22, 24 must actually enter the central cell 18c or 18d of the corresponding set and out through one of the additional chambers 30 to reach atmosphere.

Gases in the outside chamber 30 must pass through the intermediate and central chambers 22, 30 via the inter-chamber paths/openings 36 and downwardly through the drain-back/vent 34 of the central chamber 20 into one of the central cells 18c or 18d before exiting upwardly through one of the additional chambers 30. Gases entering one of the intermediate chambers take a similar path through the central chamber 20, and downwardly into the respective central cell 18c or 18d and upwardly through the respective additional chamber 30. This multi-level venting system provides a convoluted path for electrolyzed gases to travel and most importantly a convoluted path for electrolyte liquid to travel before exiting the battery through the atmospheric vents 32 when tipped onto one of the batteries sides.

The centralized placement of the additional chambers 30 places the additional drain-back/vents 35 closest to and directly communicating with atmosphere in the center of the battery cover. When a battery is tipped to one of its sides the electrolyte within each of the cells 18 accumulates on the lower most cell side.

Keeping the additional chambers 30 and additional drain-back/vents 35 centrally located on the cover, the entrance to the paths to atmosphere are kept substantially away from the battery sides where the electrolyte flows when the battery is tipped. Prior art batteries incorporate drain-back/vents close to the atmospheric vents and the sides of the battery. Applicants have discovered that multi-level venting through a centrally located additional chamber 30 directly communicating with atmospheric vents on the cover's perimeter provides exceptional battery performance and leak-resistance when the battery is tipped onto any one of its sides. If the battery was tipped onto one of its narrow sides, the electrolyte would flow downwardly through the chambers and away from the additional drain-back/vents 35.

Preferably, the additional drain-back/vent 35 in the additional chambers 30 are located very close to the central transverse axis of the cover so that when the corresponding chamber is on the lower-most side of a tilted battery, the additional drain-back/vent 35 is significantly above the electrolyte level in the central cell 18c or 18d. Continuing to analyze a battery tipped onto one of its narrow sides, the upper half of the battery has a path to atmosphere originating at the very bottom of the lower most central cell 18c or 18d (starting at the additional drain-back/vent 35) and ending at the highest part of the battery where the atmospheric vent 32 is located. Although the atmospheric vents communicate with one another through the various vent paths 52, 54, the narrow path and opening between the additional chambers 30 and the atmospheric vents 32 will cause an air-lock to occur within the paths. This air-lock prevents additional air from entering the cells 18 and thus prevents additional electrolyte from exiting the cell into any chambers communicating with them.

Placing the additional chamber openings 44 at opposite ends from the additional drain-back/vent 35 in the additional chambers 30 further increases leak-resistance. Configuring the additional chambers 30 in this manner allows for greater containment of electrolyte in the additional chamber 30 before entering the initial vent paths 50. Preferably, electrolyte levels within the cells will reach a steady-state level at which electrolyte does not spill into the initial vent paths and/or an air-lock occurs preventing electrolyte from reaching the additional chamber openings or part of the vent paths 50, 52, 54 wherein electrolyte is capable of flowing out of the battery cover through the atmospheric vent 32.

Figure 4:
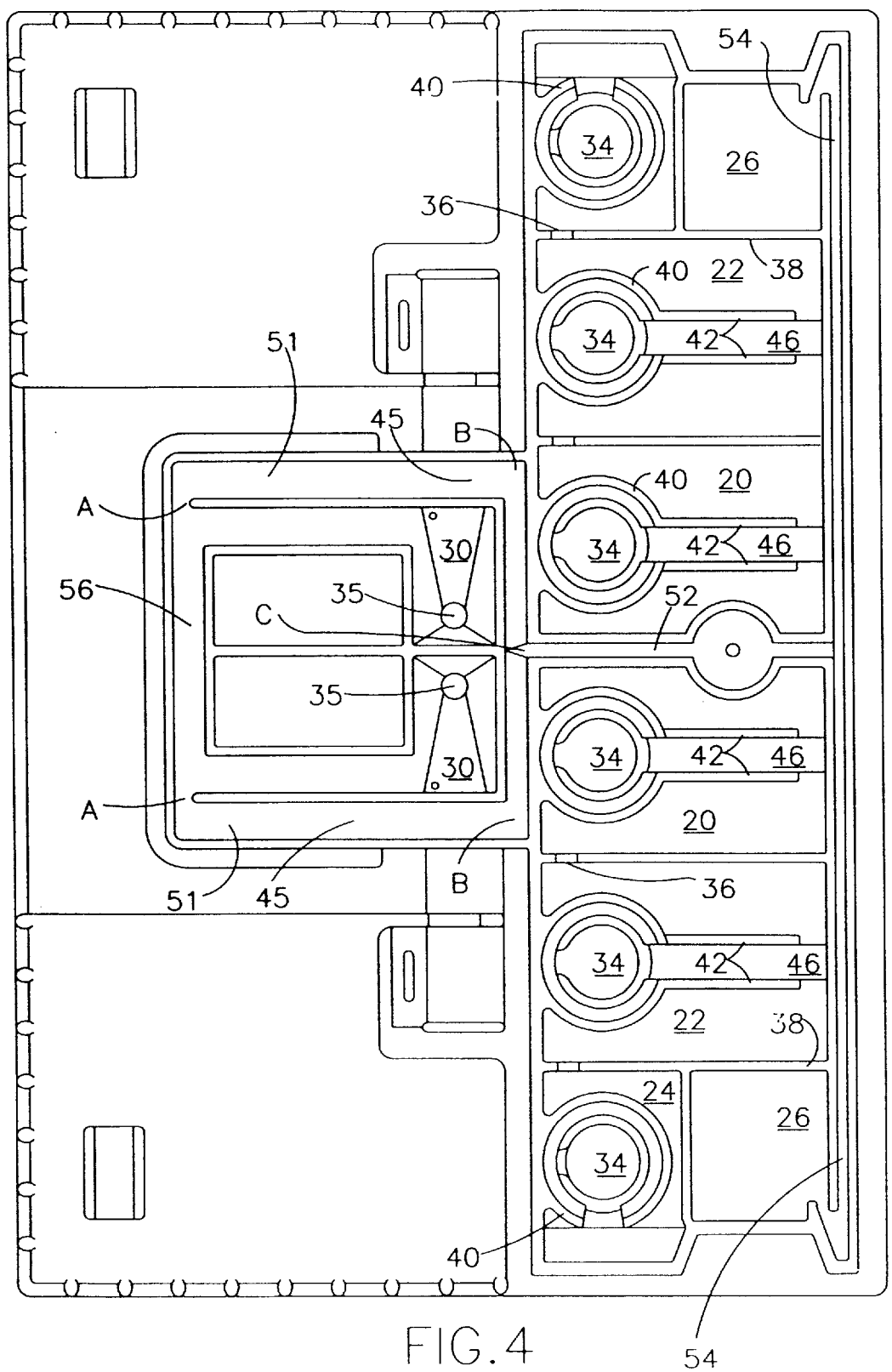
FIG. 4 is a top view of an intermediate cover of a second embodiment of the leak resistant battery closure constructed according to the present invention.

FIG. 4 discloses a second cover embodiment constructed according to the present invention. The primary difference lies in the configuration of the initial vent paths leading from the additional chambers 30. The rest of the cover is identical to the embodiment of FIG. 2 and uses like reference numbers for like parts. The initial vent paths 51 exit the additional chambers 30 from the additional chamber openings 45 in one direction and communicate with one another through a connecting path 56. The initial vent paths 51 double back in a direction opposite the one initially taken (at point A) and elbows back (at point B) to converge into the common vent path 52 (at point C). Preferably, point C begins the common vent path 52 along the central transverse axis of the battery cover. The purpose of the substantially convoluted paths formed by the initial vent paths 50 and the connecting paths 56 are to provide a path to atmosphere, when the battery is tipped onto any one of its sides, and especially the backside, which rises above the relevant electrolyte level in the corresponding central cells. Having a portion of the electrolyte path above the electrolyte level prevents additional electrolyte from entering the respective chambers or the path to atmosphere and ultimately leaking from the battery. These convoluted paths to atmosphere greatly enhance the potential for forming an air-lock when the battery is tipped to further reduce the likelihood of leakage.

FIG. 3 depicts a top cover which mates with the embodiments shown in FIG. 2. The embodiment of FIG. 4 likewise would have a mating cover (not depicted). In dual cover embodiments, such as the ones disclosed herein, the interchamber paths/openings 36 are formed in the outer covers only. However, most of the partitions and walls identically mirror the intermediate cover 14 and form a single continuous partition or wall section when the covers are heat sealed together.

Certain modifications and improvements will occur to those skilled in the art upon reading the forgoing description. It should be understood that all such modifications and improvements have been deleted herein for the sake of conciseness and readability, but are properly within the scope of the following claims.

What is claimed is:

1. A leak resistant battery cover for a battery of the type having a housing with a plurality of cells comprising:
   a) a cover member having an upper wall, a lower wall and an interior area disposed between and formed by said upper and lower walls, said interior area lying over at least a portion of at least a first and second cell;
   b) first and second apertures in said lower wall communicating with a first cell in the housing;
   c) a third aperture in said lower wall communicating with a second cell in the housing;
   d) a first path in said interior area providing communication between said second aperture and said third aperture for the flow of electrolyte gases therebetween;
   e) at least one atmospheric vent spaced from said first aperture and communicating with atmosphere; and
   f) a second path in said interior area providing communication between said first aperture and said atmospheric vent for the flow of electrolyte gases therebetween;
   wherein gases emitted upwardly through said third aperture from the second cell must travel along said first path, through said second aperture down into the first cell, upwardly through said first aperture into said second path, along said second path to said atmospheric vent and through said atmospheric vent to reach atmosphere.

2. The leak resistant battery cover of claim 1 wherein said cover member further comprises partitions between said upper and lower walls for directing the flow of liquid electrolyte or electrolyte gas within said paths and between said apertures.

3. The leak resistant battery cover of claim 1 wherein the housing includes a third cell and said cover further comprises:
   a) a fourth aperture in said lower wall communicating with the third cell in the housing;
   b) a third path communicating with the first cell and said fourth aperture and providing for the flow of electrolyte gases between said first and third cells;
   wherein gases emitted upwardly through said fourth aperture from the third cell must travel along said third path and ultimately into the first cell, through said first aperture into said second path, along said second path to said atmospheric vent and through said atmospheric vent to reach atmosphere.

4. The leak resistant battery cover of claim 3 further wherein said third path communicates with said third aperture.

5. The leak resistant battery cover of claim 3 further wherein said third path communicates with said first path.

6. The leak resistant battery cover of claim 3 further wherein said third path communicates with said second aperture.

7. The leak resistant battery cover of claim 3 further wherein said third path and said first path have a portion in common.

8. The leak resistant battery cover of claim 1 wherein said first path includes a chamber within said interior area proximate to and surrounding said second aperture.

9. The leak resistant battery cover of claim 1 wherein said first path includes a chamber within said interior area proximate to and surrounding said third aperture.

10. The leak resistant battery cover of claim 1 wherein said second path includes a chamber within said interior area proximate to and surrounding said first aperture.

11. The leak resistant battery cover of claim 1 wherein said first path includes a first chamber within said interior area proximate to and surrounding said second aperture and a second chamber within said interior area proximate to and surrounding said third aperture, and said second path includes a third chamber within said interior area proximate to and surrounding said first aperture.

12. The leak resistant battery cover of claim 1 wherein said paths have floors continuously sloping downward towards respective said apertures to guide the flow of liquid electrolyte back into battery cells.

13. The leak resistant battery cover of claim 1 wherein one of said chambers includes a partition substantially surrounding a corresponding said aperture.

14. The leak resistant battery cover of claim 13 wherein said partition substantially surrounding the corresponding said aperture is semi-annular.

15. The leak resistant battery cover of claim 13 wherein said chambers are substantially rectangular.

16. The leak resistant battery cover of claim 1 wherein said aperture is a cell vent.

17. The leak resistant battery cover of claim 1 wherein said aperture is a cell drain.

18. The leak resistant battery cover of claim 1 wherein said aperture is a cell drain and a cell vent.

19. The leak resistant battery cover of claim 18 wherein said cell drain and said cell vent is an integrated vent and drain back unit.

20. The leak resistant battery cover of claim 1 wherein said first and second apertures are substantially centrally located on said cover.

21. The leak resistant battery cover of claim 1 wherein said first aperture is centrally located on said cover.

22. The leak resistant battery cover of claim 1 having two said atmospheric vents wherein said second path splits into two final sections communicating with said respective two atmospheric vents.

23. The leak resistant battery cover of claim 1 wherein at least one of said paths are convoluted.

24. A leak resistant battery cover for a battery of the type having a plurality of adjacent cells separated by walls within a conventional housing wherein two of the cells are adjacent and centrally positioned along a length of the housing and at least two of the cells are positioned on opposite sides of the centrally positioned cells towards housing ends, said cover adapted to sealably engage the housing and walls and comprises:

a) a flat rectangular cover member having an interior area with a central area;
 b) two central apertures in said central area and within said interior, each communicating with one of the centrally positioned cells;
 c) two additional apertures in said central area within said interior, each communicating with one of the centrally positioned cells and at least one atmospheric vent through a vent path;
 d) two outside apertures within said interior, each communicating with one of the cells positioned on opposite sides of the centrally positioned cells; and
 e) one said central aperture communicating with one said outside aperture within said cover and the other said central aperture communicating with the other said outside aperture within said cover;

wherein electrolyte gases emitted at the respective outside cells travel upwardly through the corresponding said outside apertures, downwardly into the associated central cells through said central apertures, upwardly from the associated central cells through said additional aperture and through said vent path to said atmospheric vent.

25. The leak resistant battery cover of claim 24 wherein at least one of said paths are convoluted.

* * * * *